United States Patent [19]

Hashimoto et al.

[11] 4,170,788

[45] Oct. 9, 1979

[54] MAGNETIC HEAD

[75] Inventors: Komei Hashimoto; Masahiro Komatsubara; Shinji Yasuda; Yutaka Masumoto; Kazuhiko Satoh, all of Tokorozawa, Japan

[73] Assignee: Pioneer Electronic Corporation, Tokyo, Japan

[21] Appl. No.: 839,467

[22] Filed: Oct. 4, 1977

[30] Foreign Application Priority Data

Oct. 5, 1976 [JP] Japan .................................. 51-119547

[51] Int. Cl.$^2$ .......................... G11B 5/10; G11B 5/251; G11B 5/12
[52] U.S. Cl. .................................... 360/129; 360/120; 360/125
[58] Field of Search ............... 360/122, 120, 119, 123, 360/129, 125-127

[56] References Cited

U.S. PATENT DOCUMENTS

| 2,928,907 | 3/1960 | Lubkin | 360/129 |
| 3,578,920 | 5/1971 | Okamoto | 360/120 |

Primary Examiner—Robert S. Tupper
Attorney, Agent, or Firm—Sughrue, Rothwell, Mion, Zinn and MacPeak

[57] ABSTRACT

A magnetic head for tape recorders and the like is manufactured with cores made of alloys of elements such as Al and Fe which have relatively large potential differences. In order to avoid the galvanic effect which may be produced by segregation and impurities in the alloys, a part of the tape sliding surface is made of an element such as Zn which is lower in galvanic potential than elements forming the cores, and that part of the tape sliding surface is made electrically conductive to the cores.

7 Claims, 8 Drawing Figures

MAGNETIC HEAD

BACKGROUND OF THE INVENTION

This invention relates to magnetic heads for tape recorders and the like, and more particularly to a method of preventing corrosion of the magnetic cores forming such a magnetic head.

Heretofore, Permalloy (a trademark of Western Electric Co. for an alloy composed approximately of 78% Ni, 0.3% Mo and the remainder Fe) and ferrite have been employed as core materials for magnetic heads. These materials have the following contrasting characteristics: The Permalloy is superior in magnetic characteristics, but is low in wear resistance; while the ferrite is high in wear resistance, but is inferior in magnetic characteristics because it is magnetically saturated in a short time. On the other hand, alloys known in Japan by the names "Sendust" and "Alperm" are well known in the art as magnetic core materials which are superior in magnetic characteristics and high in wear resistance. "Sendust" is an alloy composed approximately of 5 to 11% Si, 3 to 8% Al and the remainder Fe, while "Alperm" is an alloy composed approximately of 13 to 17% Al and the remainder Fe. However, these materials still have a drawbacks that, unlike the Permalloy and the ferrite, they are inferior in anticorrosive characteristic. In other words, the Permalloy shows an excellent anticorrosive characteristic under any circumstance because it has about an 80% Ni content and about a 20% Fe content. The ferrite also shows an excellent anticorrosive characteristic because it is a stable oxide.

"Sendust" and "Alperm" are generally considered to have good anticorrosive characteristics; however, when they are placed in a high humidity atmosphere or water drops are allowed to drop thereon, a local corrosion called "pitting corrosion" sometimes occurs. The reason for this is believed to be that it is impossible to manufacture the aforementioned alloys which are completely uniform; that is, in the manufacture of the alloys segregation is caused to a slight extent and impurities contained therein form cores. ("Sendust" and "Alperm" show excellent anticorrosive characteristics when they are alloys which are physically completely uniform.) The "Sendust" and "Alperm" are alloys which are low in galvanic potential order and have large amounts of Al and Fe the potential difference of which is relatively large. Accordingly, if completely uniform alloys are not obtained due to the aforementioned segregation or impurities contained therein, minute galvanic cells are formed at the portions of the alloys where the segregation has occurred or the impurities are contained, because of the potential difference between Al and Fe. Accordingly, the minute galvanic cells are discharged through the water films or water drops formed in a high humidity atmosphere surrounding the alloys, as a result of which local corrosions, namely, pitting corrosions are caused. If this pitting corrosion is caused, the density of oxygen contained in the water film or water drop becomes non-uniform, as a result of which a battery action due to the non-uniform oxygen density is effected. Accordingly, the pitting corrosion is advanced at a high rate; that is, a recess which is several tens of micrometers both in diameter and in depth is formed in several tens of minutes to several hours.

In the case where the "Sendust" or "Alperm" is employed for manufacturing magnetic heads, water drops or water films may be allowed to adhere to the magnetic head due to the variations of the environmental conditions, thereby causing pitting corrosion in the magnetic head. If the pitting corrosion does not occur at the gap of the magnetic head or in the vicinity of the gap, the corrosion will not be a problem. However, if the pitting corrosion is caused at the gap of the magnetic head or in the vicinity of the gap as shown in FIG. 1, the magnetic head can no longer maintain its initial performance, because while the width of the gap is, in general, several micrometers, the size of the pitting corrosion is extremely large as was described before.

"Sendust" and "Alperm" being alloys containing Al, Fe, Si, etc., these elements having different dissolution temperature and specific gravity, it is considerably difficult to manufacture an alloy free of segregation and interposed impurities. This is one of the significant reasons why "Sendust" or "Alperm" has not been employed for manufacturing magnetic heads even though superior in magnetic characteristics and wear resistance.

SUMMARY OF THE INVENTION

Accordingly, an object of this invention is to provide a magnetic head made of "Sendust" or "Alperm" and having a high performance, a long service life, and a high stability in which the pitting corrosion or other corrosion of the "Sendust" or "Alperm" is prevented, and the magnetic characteristics and wear resistance thereof are sufficiently utilized.

The foregoing and other objects are attained by making a part of the tape sliding surface with the exception of the magnetic cores and a shield plate of an element which is lower in galvanic potential than the elements forming the magnetic cores and shield plate. The part of the sliding surface with the exception of the magnetic cores and shield plate are made electrically conductive to the magnetic cores and shield plate.

DETAILED DESCRIPTION OF THE PREFERRED EMBODIMENTS

Figure 1:
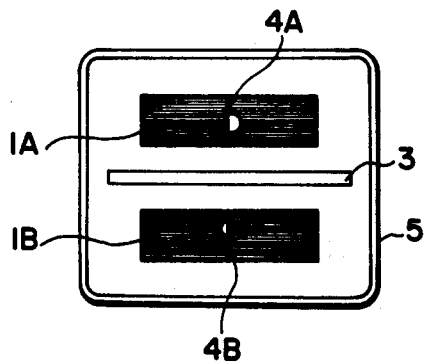
FIG. 1 is a front view of a conventional magnetic head in which pitting corrosion is caused.
Figure 2:
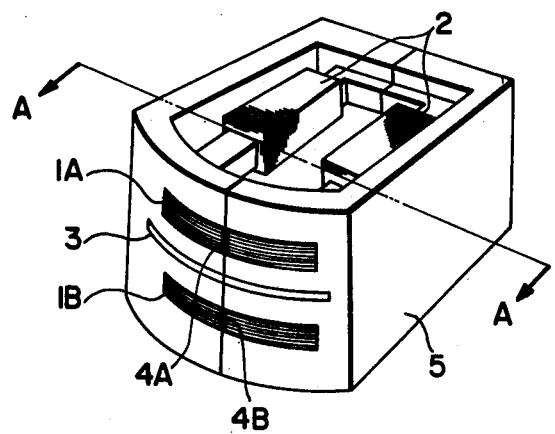
FIG. 2 is a perspective view illustrating a construction of the magnetic head according to this invention.
Figure 3:
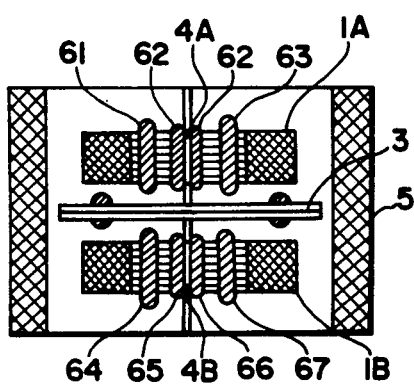
FIG. 3 is a sectional view taken along line A-A' in FIG. 2.

One example of the construction of a magnetic head according to the invention is shown in FIG. 2 (in which auxiliary components such as for instance a shield case are not shown for simplification of the drawing). FIG. 3 is a sectional view of the magnetic head taken along line A-A' in FIG. 2, and shows the magnetic head as viewed from the inside thereof. Cores 1A and 1B and a shield plate 3 are made of "Sendust" or "Alperm". Gap spacers 4A and 4B, and a core holder 5 are made of a metal, for instance Zn, which is much lower in galvanic potential than Al, Fe, and Si which are elements forming the "Sendust" or "Alperm" alloys of the core material. Conductive paints 61 through 68 provide electrical conduction among the cores 1A and 1B, the shield plate 3, the gap spacers 4A and 4B, and the core holder 5. In the case where the cores 1A and 1B and the shield plate 3 are of laminated construction as shown in the figures, the conductive paints are applied so that all of the laminated plates are conductive to the gap spacers 4A and 4B or the holder 5.

If in the vicinity of a metal which should be protected from corrosion there is provided a metal which is lower in galvanic potential order than the elements forming the former metal, and the two metals, are maintained electrically conductive to each other, a so-called cathode anticorrosive effect can be obtained. For instance, in the case where the magnetic head is placed in water or in a high humidity atmosphere, the cores 1A and 1B or the shield plate 3, and the gap spacers 4A and 4B or the core holder 5 will be subjected to water or a water film simultaneously. An extremely small part of the gap spacers 4A and 4B or the holder 5, all of which are made of the material which is low in galvanic potential order, will be dissolved water or in the water film, but the cores 1A and 1B or the shield plate 3 will neither corode nor rust.

Therefore, according to this invention, corrosion such as pitting corrosion will only occur in the cores 1A and 1B or the shield plate 3 if water drops on the core section only or on the shield plate section only. The size of a water drop is undoubtedly extremely small when compared with the width of the ordinary magnetic head. In addition, such a small water drop will be dried soon. Therefore, the aforementioned pitting corrosion will not grow into a large one. The production of pitting corrosion at the gap or in the vicinity of the gap can be absolutely prevented by the use of such a metal as described before. As was described, a part of the gap spacers 4A and 4B or the holder 5 is dissolved in water. However, this does not actually occur, because the amount of dissolution is extremely minute when a water film or water drop is allowed to adhere thereto at a high humidity which may occur ordinarily, except when the gap spacers or the holder is left in water for more than several days for instance.

Figure 4:
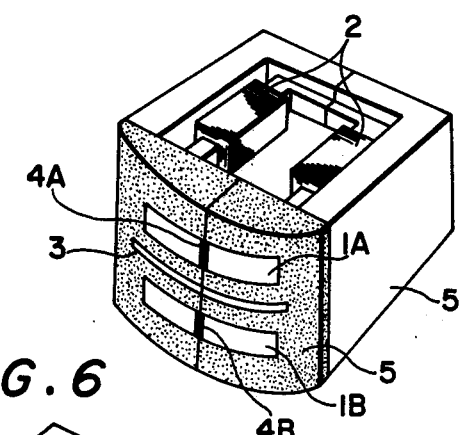
FIG. 4 is a perspective view illustrating a construction of another example of the magnetic head according to the invention.
Figure 5:
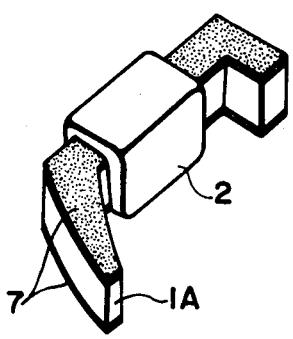
FIGS. 5 through 8 are perspective views of the cores and the shield plate of the magnetic head according to the invention.
Figure 6:
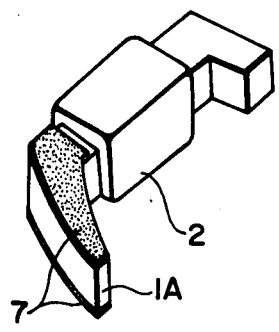
Figure 8:
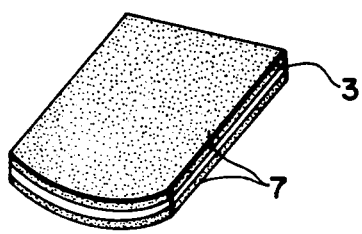
Figure 7:
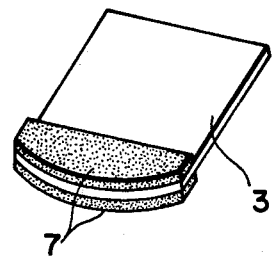

One example of the magnetic head according to this invention has been described with reference to FIGS. 2 and 3. However, it should be noted that it is unnecessary to make the holder with the above described metal in its entirety. That is, the front parts of the magnetic head except for the cores and the shield plate may be made of the aforementioned metal as shown in FIG. 4. Alternatively, the aforementioned metals may be provided on the cores or the shield plate in advance of assembly as shown in FIGS. 5 through 8. If the metal is electrically conductive to the cores or the shield plate, application of the conductive paint is not always necessary. For instance, in this case, a leaf spring made of the metal may be employed.

In this description, a foil of the aforementioned metal which is the gap forming material is used as the spacer. However, the aforementioned metal may be deposited on the parts of the cores forming the gaps, to a predetermined thickness (or a gap width) by vacuum evaporation or plating. In this case, the application of conductive paint aforementioned is unnecessary.

At any rate, anticorrosion of the cores and the shield plate can be obtained by forming with the aforementioned metal the part of the magnetic head which is other than the cores and the shield plate and is adjacent to the cores and the shield plate, and by placing the metal, the cores, and the shield plate in electrical conductive state or by placing, when the cores and the shield plate are made of laminated plates, all of the laminated plates and the metal.

As is apparent from the above description, according to the invention, the anticorrosive characteristic of "Sendust" or "Alperm" which was its problem to be solved has been improved, and the magnetic head higher in performance and longer in service life has been provided which utilizes the excellent magnetic characteristics and high wear resistance of these materials. This invention has been described with reference to a two-track two-channel magnetic head; however, it is obvious that the invention can be applied all sorts of magnetic heads including magnetic heads for cassette tape recorders, which use "Sendust" or "Alperm".

What is claimed is:

1. A magnetic head for a magnetic recording and reproducing instrument, such as a tape recorder, said head being of the type having a sliding surface including a magnetic core defining a gap, a shield plate, a core holder and a gap spacer, the improvement comprising at least one of said core holder and gap spacer being constructed of a material having a lower galvanic potential than the elements forming said magnetic core and said shield plate, and means electrically interconnecting said at least one of said core holder and gap spacer with said magnetic core and said shield plate.

2. A magnetic head as claimed in claim 1 wherein said means electrically interconnecting is electrically conductive paint on the inside surface of the sliding surface of said magnetic head, said conductive paint including at least one part covering a part of said core and a part of said core holder, at least a second part covering a part of said shield plate and a part of said core holder and wherein said housing is formed of a material having a lower galvanic order than said magnetic core and said shield plate.

3. A magnetic head as claimed in claim 2 wherein said gap sapcer is formed of a material having a lower galvanic order than said magnetic core, and wherein said conductive paint further includes at least a third part covering a part of said gap spacer and a part of said magnetic core.

4. A magnetic head as claimed in claim 1 wherein said core holder has a lower galvanic order than said magnetic core and said shield plate.

5. A magnetic head as claimed in claim 1 wherein said gap spacer has a lower galvanic order than said magnetic core and said shield plate.

6. A magnetic head as claimed in claim 1 wherein said magnetic core and shield plate are made of Sendust.

7. A magnetic head as claimed in claim 1, wherein said magnetic core and shield plate are made of Alperm.

* * * * *